US012624226B2

(12) United States Patent
Alghamdi et al.

(10) Patent No.: US 12,624,226 B2
(45) Date of Patent: *May 12, 2026

(54) DROP CASTING METHOD TO FORM CORROSION PROTECTIVE COMPOSITE LAYER

(71) Applicant: Imam Abdulrahman Bin Faisal University, Dammam (SA)

(72) Inventors: Jwaher M. Alghamdi, Dammam (SA); Hissah A. Alqahtani, Dammam (SA); Nuhu Dalhat Mu'azu, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 39 days.

This patent is subject to a terminal disclaimer.

(21) Appl. No.: 18/916,383

(22) Filed: Oct. 15, 2024

(65) Prior Publication Data

US 2025/0034407 A1     Jan. 30, 2025

Related U.S. Application Data

(63) Continuation of application No. 18/351,840, filed on Jul. 13, 2023, now Pat. No. 12,146,073.

(51) Int. Cl.
*C09D 5/08* (2006.01)
*C09D 7/40* (2018.01)
(Continued)

(52) U.S. Cl.
CPC ............... *C09D 5/084* (2013.01); *C09D 7/61* (2018.01); *C09D 7/70* (2018.01); *C09D 7/80* (2018.01); *C09D 127/16* (2013.01); *C08K 7/00* (2013.01)

(58) Field of Classification Search
CPC ... C09D 5/08; C09D 7/40; C09D 7/61; C09D 7/80; C09D 7/16; C09D 7/00
See application file for complete search history.

(56) References Cited

U.S. PATENT DOCUMENTS 6,071,436 A     6/2000   Incorvia
9,353,272 B2    5/2016   Hsieh et al.
(Continued)

FOREIGN PATENT DOCUMENTS

EP      2 838 672 B1     2/2019
RO        137660 A2 *    3/2022    ............. C23C 18/31

OTHER PUBLICATIONS

Kumar, Archana Kaliyaraj Selva, et al., "A mini-review: How reliable is the drop casting technique?". Electrochemistry Communications, vol. 121, Dec. 2020, 106867, pp. 1-10.*
(Continued)

*Primary Examiner* — Bret P Chen
(74) *Attorney, Agent, or Firm* — Oblon, McClelland, Maier & Neustadt, L.L.P.

(57) ABSTRACT

A method of reducing corrosion, including coating a surface of a substrate with a corrosion inhibitor to form a coated substrate, and contacting the coated substrate with a corrosive medium, wherein the coated substrate in the corrosive medium has an $i_{corr}$ of less than 0.01 $\mu A\,cm^{-2}$. The corrosion inhibitor includes polyvinylidene fluoride (PVDF), and a layered double hydroxide (LDH) having a formula of $X_2Al$, wherein X is Mg or Zn.

17 Claims, 13 Drawing Sheets

50

Coat a surface of a substrate with a corrosion inhibitor to form a coated substrate — 52

Contact the coated substrate with a corrosive medium — 54

(51) Int. Cl.

| | |
|---|---|
| *C09D 7/61* | (2018.01) |
| *C09D 7/80* | (2018.01) |
| *C09D 127/16* | (2006.01) |
| *C08K 7/00* | (2006.01) |

(56) References Cited

U.S. PATENT DOCUMENTS

| | | | |
|---|---|---|---|
| 10,246,594 | B2 | 4/2019 | Ijeri et al. |
| 10,738,199 | B2 | 8/2020 | Ljeri |
| 10,953,434 | B2 | 3/2021 | Bautista Mester et al. |
| 11,296,243 | B2 * | 4/2022 | Ghidiu .............. C04B 35/58007 |
| 2014/0227616 | A1 | 8/2014 | Yamada |
| 2016/0049690 | A1 | 2/2016 | Basak |
| 2017/0202978 | A1 | 7/2017 | Thompson |
| 2019/0300692 | A1 | 10/2019 | Teansawang |
| 2019/0330757 | A1 | 10/2019 | Golden et al. |
| 2020/0212489 | A1 | 7/2020 | Chang |
| 2020/0222939 | A1 | 7/2020 | Andreani |
| 2021/0040334 | A1 * | 2/2021 | Kinlen ................... C09D 5/084 |
| 2022/0069316 | A1 * | 3/2022 | Seshubabu ............ H01M 12/08 |
| 2022/0199994 | A1 | 6/2022 | El-Kady |

OTHER PUBLICATIONS

Pandey, Rajiv Kumar, et al., "Corrosion prevention of commercial alloys by air-water interface grown, edge on oriented, ultrathin squaraine film". Scientific Reports (2019) 9:13488, pp. 1-12.*

Yamada, Noriyasu, et al., "A poly(vinylidene fluoride) film printing system using solution droplet casting". Smart Mater. Struct. 28 044003 (2019), pp. 1-9.*

Jing, Chuan, et al., "Corrosion inhibition of layered double hydroxides for metal-based systems". Nano Materials Science, vol. 3 , Issue 1, Mar. 2021, pp. 47-67.*

AlGhamdi, Jwaher M., et al., "Revolutionizing corrosion protection in seawater using innovative layered double hydroxide/ polyvinylidene fluoride LDH@PVDF composite coating". Arabian Journal of Chemistry 17 (2024) 105775, pp. 1-17.*

Wint et al.; The use of anion exchange pigments to inhibit the filiform corrosion of zinc-aluminium-magnesium coated steel; Corrosion Science ; Oct. 11, 2021 ; 31 Pages.

Li et al.; Enhanced corrosion protection of magnesium alloy via in situ Mg—Al LDH coating modified core-shell structured Zn—Al LDH@ZIF-8; Rare Metals 41; 2022 ; 4 Pages ; Abstract Only.

Hu, Jing, et al., "Layered double hydroxide membrane with high hydroxide conductivity and ion selectivity for energy storage device". Nature Communications (2021) 12:3409, pp. 1-10.

Shkirskiy, V., et al., "Factors Affecting MoO4(2−) Inhibitor Release from Zn2Al Based Layered Double Hydroxide and Their Implication in Protecting Hot Dip Galvanized Steel by Means of Organic Coatings". ACS Appl Mater Interfaces, Nov. 18, 2015;7(45): 25180-92.

Li, Pu-Bo, et al., "Enhanced corrosion protection of magnesium alloy via in situ Mg—Al LOH coating modified by core-shell structured Zn—Al LDH@ZIF-8". Rare Metals (2022) 41(8) 2745-2758.

Radwan, A Bahgat, et al., "Corrosion protection of electrospun PVDF-ZnO superhydrophobic coating". Surface and Coating Technology, 289 (2016) 136-143.

Zeng, Haojie, et al., "Environmentally friendly electrostatically driven self-assembled LOH/GO/ PVDF composite membrane for water treatment". Applied Clay Science, 183 (2019) 105322 pp. 1-11.

Mei, Qingqing, et al., "Morphological control of poly(vinylidene fluoride) @layered double hydroxide composite fibers using metal salt anions and their enhanced performance for dye removal". RSC Advances, 2017, 7, 46576-46588.

Cui, Jiuyun, et al., "Facile preparation of grass-like structured NiCo-LDH/PVDF composite membrane for efficient oil-water emulsion separation". Journal of Membrane Science 573 (2019) 226-233.

On, Ba-Da, et al., "Rollable Ultraviolet Photodetector Based on ZnAl-Layered Double Hydroxide/ Polyvinylidene Fluoride Membrane". Advanced Materials Interfaces 2022, 9, 2201052, pp. 1-10.

AlGhamdi, Jwaher M., et al., "Revolutionizing corrosion protection in seawater using innovative layered double hydroxide/ polyvinylidene fluoride LDH@PVDF composite coatings". Arabian Journal of Chemistry 17 (2024) 105775 pp. 1-17.

Abbasi, Mahboobeh, et al., "Facile fabrication of leaf coral-like structured Cu—Al LDH/PVDF composite adsorptive membrane with enhanced adsorption performance". Materials Science and Engineering B 267 (2021) 115086 pp. 1-10.

Wang, Qiang, et al., "Recent Advances in the Synthesis and Application of Layered Double Hydroxide (LOH) Nanosheets". Chemical Reviews 2012, vol. 112, Issue 7, 4124-4155.

Zhang, Yaping, et al., "Preparation and application of layered double hydroxide nanosheets". RSC Advances, 2021, 11, 24254-24281.

* cited by examiner

200 μm

100 μm

200 μm

100 μm

| Bare substrate | Pure PVDF | MLDH @PVDF | ZLDH @PVDF |
|---|---|---|---|

Before immersing

| Bare substrate | Pure PVDF | MLDH @PVDF | ZLDH @PVDF |
|---|---|---|---|

1 day

| Bare substrate | Pure PVDF | MLDH @PVDF | ZLDH @PVDF |
|---|---|---|---|

12 days

| Bare substrate | Pure PVDF | MLDH @PVDF | ZLDH @PVDF |

39 days

| Bare substrate | Pure PVDF | MLDH @PVDF | ZLDH @PVDF |

60 days

1

DROP CASTING METHOD TO FORM CORROSION PROTECTIVE COMPOSITE LAYER

CROSS-REFERENCE TO RELATED APPLICATIONS

The present application is a Continuation of U.S. application Ser. No. 18/351,840, now U.S. Pat. No. 12,146, 073, having a filing date of Jul. 13, 2023.

BACKGROUND

Technical Field

The present disclosure is directed to a corrosion inhibitor, particularly to a method of reducing corrosion using layered double hydroxide composites.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Corrosion causes major issues, whether economic or environmental, in a variety of applications. Thus, research has been performed on determining problems and minimizing damages by lowering the kinetics and altering the mechanism of corrosion. Numerous techniques to preserve metals from corrosion, such as the addition of corrosion-resisting materials (inhibitors), cathodic protection, and coatings, have been developed.

Particularly for steel, the most common approach to protect the surface of the metal from corrosion is adding barriers between the surface and the corrosive media. Physical barrier films are formed on the surface as a coating between the metal and the surrounding environment. The application of protective coatings, which typically consist of several layers depending on the final application, delay the chemical corrosion reactions on the surface by isolating the substrate from a corrosive medium. Chromates, which are well-known for their potent ability to prevent corrosion, have been used to prepare two of these layers, the primer, and the pre-treatment. However, hexavalent chromium is known to cause cancer, and numerous efforts have been made to replace it with a more eco-friendly alternative. Therefore, development of corrosion-inhibiting species for chromate-free coatings has been investigated.

Polymeric coatings are an effective method to protect metals due to their ability to reduce the rate of diffusion of electrolytes by reducing the permeability of coatings. Polyvinylidene fluoride (PVDF), a semi-crystalline polymer with amorphous and crystalline phases, has excellent processing properties, and chemical and thermal stability and has been employed in coatings. However, the delicate quality of PVDF causes the superhydrophobic covering to be effectively harmed by the grating surface, which diminishes the adhesion to most substrates, bringing about a decline or loss of super-hydrophobicity. Further, the PVDF matrix's free volumes cause a variety of pores or scratches to form, causing the protective film to become permeable to oxygen, water, and ions and allowing the metallic surface to be exposed to the corrosive medium more easily. Long-term corrosion protection is compromised by this, thereby preventing its use in industry. Nanofillers, such as graphene, carbon nanotube, silica, and nano-clay, have been added to the polymeric coatings to overcome this issue and create nanocomposites that are suitable for preventing corrosion on a metallic surface. The incorporated nanomaterials not only impede the diffusion of the penetrant species but also strengthen the structure of the nanocomposite coatings. Inorganic fillers have shown great potential due to improving the properties and reducing the porosity of polymers. Recently, layered double hydroxides (LDHs) (anionic clays) have received attention due to their high reactivity towards organic anionic species.

Layered clay materials have a unique two-dimensional structure with hydroxyl groups on the edges and surface. LDHs are considered an inorganic host for different species with positively charged brucite-like layers that are balanced by anions and water molecules between the interlayer regions which allow the possibility to use a wide variety of intercalation compounds. LDH can be represented by the formula $[MII_{1-x} \; MIII_x(OH)_2]^{x+}(Ay^-)x/y \cdot zH_2O$ where MII (e.g., $Mg^{2+}$, $Ca^{2+}$, $Cu^{2+}$, $Mn^{2+}$, $Ni^{2+}$, $Zn^{2+}$) and MIII are the divalent and trivalent metallic cations (e.g., $Al^{3+}$, $Cr^{3+}$, $Fe^{3+}$, $Mn^{3+}$, $Co^{3+}$), respectively. Moreover, LDHs are typically hydrophilic in nature. Many options of modifications are possible by either changing the chemical composition of the hydroxide layer by grafting or replacing the anions at the interlayer galleries.

Polymer-clay nanocomposites have advantages such as practicality, low cost, ability to be modified, and potential for improving adhesive properties. Prior to use, the surface of the clay minerals can be altered to be organophilic in order to make them compatible with organic polymers. The organic modification expands the space between layers, which in turn raises the d spacing. As a result, the organic modification encourages polymer or its precursor diffusion into the interlayer space. Intercalated and exfoliated nanocomposites are forms of nanocomposites that can be created when clay minerals and polymer are mixed. The clay layers in exfoliated nanocomposites will be sufficiently dispersed and oriented randomly to permit interfacial bonding with the polymer matrix, enhancing the properties of nanocomposites.

Although, corrosion inhibitors have been developed in the past, there still exists a need to develop corrosion inhibitors with improved corrosion resistance for long-term. Accordingly, it is one object of the present disclosure to provide an improved, durable, and cost-effective corrosion inhibitor composition, that is effective in preventing the corrosion of metals.

SUMMARY

In an exemplary embodiment, a method of reducing corrosion is described. The method includes coating a surface of a substrate with a corrosion inhibitor to form a coated substrate; and contacting the coated substrate with a corrosive medium. The coated substrate in the corrosive medium has an $i_{corr}$ of less than 0.01 A $cm^{-2}$. The corrosion inhibitor includes polyvinylidene fluoride (PVDF); and a layered double hydroxide (LDH) having a formula of $X_2Al$, wherein X is Mg or Zn.

In some embodiments, the corrosion inhibitor comprises 1-5 wt. % of the LDH and 95-99 wt. % of the PVDF, based on a total weight of the corrosion inhibitor.

In some embodiments, the LDH is delaminated and in a form of dispersed flakes.

In some embodiments, the PVDF penetrates between and is interfacially bonded with the dispersed flakes of the LDH.

In some embodiments, an interlayer anion of the LDH is $NO_3^-$.

In some embodiments, when coated on the substrate the PVDF is porous with an average pore size of 100 nm to 2 μm.

In some embodiments, the LDH penetrates and at least partially fills the pores of the PVDF.

In some embodiments, the LDH fills at least 80% of the pores of the PVDF.

In some embodiments, the coating is performed a single time to form a single layer of the corrosion inhibitor on the surface of the substrate.

In some embodiments, the coating is performed by a method including sonicating the LDH in a solvent for 20-50 minutes to form a homogeneous dispersion; mixing the PVDF into the homogeneous dispersion at a temperature of 30-50° C. for 20-50 minutes to form a mixture; and drop-casting the mixture on the surface of the substrate and drying at temperature of 130-180° C. for 1-5 hours to form the coated substrate.

In some embodiments, the drop-casting is performed for a single time.

In some embodiments, the substrate is made from at least one material selected from the group consisting of carbon steel, stainless steel, iron, copper, nickel, and alloys thereof.

In some embodiments, the corrosive medium comprises an aqueous solution at least one salt selected from the group consisting of an alkali metal salt, an alkaline earth metal salt, and hydrates thereof.

In some embodiments, the corrosive medium has a temperature of 30-70° C.

In some embodiments, the corrosion inhibitor reduces the $i_{corr}$ by at least 200 times compared to the same substrate but without the corrosion inhibitor.

In some embodiments, the method includes contacting the coated substrate with a corrosive medium for at least 24 hours.

In some embodiments, the LDH is made by a method including mixing a salt of X and aluminum nitrate in a solvent to form a first mixture; adding sodium nitrate to the first mixture while maintaining a constant pH of 9.5±0.5 and while bubbling with nitrogen to form a second mixture; heating the second mixture to a temperature of 100-150° C. in a sealed autoclave for 1-5 days to form a precipitate; and separating, washing, and drying the precipitate to form the LDH.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
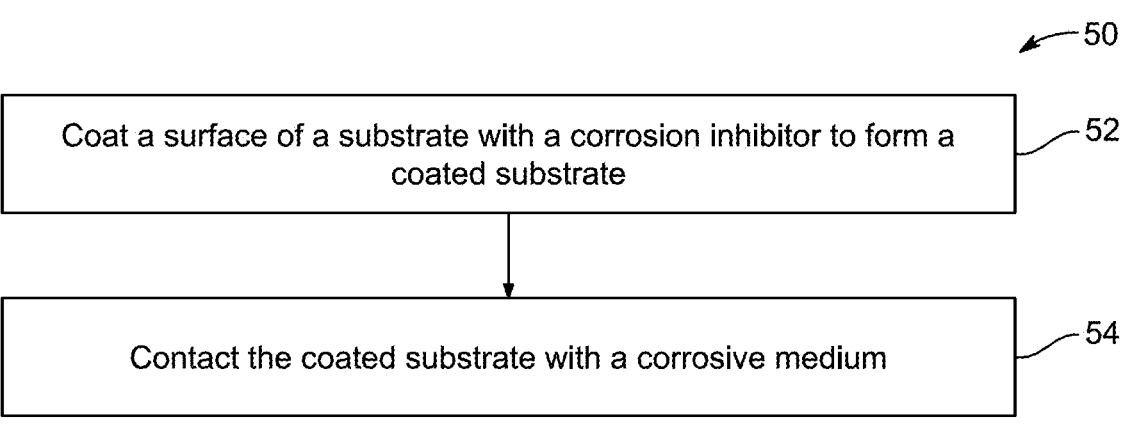
FIG. 1A is a flowchart depicting a method of reducing corrosion, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

As used herein, the term 'working electrode' refers to the electrode in an electrochemical cell/device/sensor on which the electrochemical reaction of interest is occurring.

As used herein, the term 'counter electrode' refers to the electrode used in an electrochemical cell for voltammetric analysis or other reactions in which an electric current is expected to flow.

As used herein, "corrosion" refers to the process which converts refined metals to their more stable oxide. It is the gradual loss of a material (usually metals) by chemical reaction with their environment. Commonly, this means electrochemical oxidation of metal in reaction with an oxidant such as oxygen. Rusting, the formation of iron oxides is a well-known example of electrochemical corrosion producing oxide(s) and/or salt(s) of the original metal. Corrosion degrades the useful properties of materials and structures including strength, appearance and permeability to liquids and gases. Many structural alloys corrode merely from exposure to moisture in air, but the process can be strongly affected by exposure to certain substances. Because corrosion is a diffusion-controlled process, it generally occurs on exposed surfaces.

As used herein, a "corrosion inhibitor" refers to a chemical compound or composition that when added to a material and/or contacted with a corrodible substrate, typically a metal or an alloy, decreases the corrosion rates of the material. Inhibitors often play an important role in the oil extraction and processing industries where they have always been considered to be the first line of defense against corrosion. Cathodic corrosion inhibitors prevent the occurrence of the cathodic reaction of the metal. These inhibitors have metal ions able to produce a cathodic reaction due to alkalinity, thus producing insoluble compounds that may precipitate selectively on cathodic sites. This may deposit over the metal a compact and adherent film that restricts the diffusion of reducible species in these areas. This may increase the impedance of the surface and the diffusion restriction of the reducible species, that is, the oxygen diffusion and electrons conductive in these areas. Anodic inhibitors (also referred to as passivation inhibitors) act by reducing anodic reaction, blocking the anode reaction and supporting the natural reaction of passivation substrate, they may also act by forming a film adsorbed on the metal. In general, the inhibitors react with the corrosion product, initially formed, resulting in a cohesive and insoluble film on the substrate.

As used herein, "parts per million" or "ppm" refers to an expression of concentration by mass or weight. For example, 1 ppm of a corrosion inhibitor denotes a 1:1,000,000 weight ratio of corrosion inhibitor per total weight of fluid (e.g. liquids, gases or combinations thereof) contacting the substrate. Alternatively, 1 ppm of a corrosion inhibitor denotes a 1:1,000,000 weight ratio of the corrosion inhibitor per total weight of fluid contained or carried within oil and gas infrastructure having the substrate.

Aspects of the present disclosure are directed to a method of reducing corrosion using a coating of polymer and layered double hydroxide composites (LDH) nanocomposite on a surface of a substrate. The coatings are effective in preventing/reducing the corrosion of metals in contact with corrosive media.

FIG. 1A illustrates a flow chart of a method 50 of reducing corrosion. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes coating a surface of a substrate with a corrosion inhibitor to form a coated substrate. In some embodiments, the substrate is part of a system. As used herein, "systems" include, but are not limited to, systems used in petroleum (e.g., crude oil and its products) or natural gas production, such as well casing, transport pipelines, drilling and other oil field applications, transport, separation, refining, storage, and other liquid natural gas and petroleum-related applications, geothermal wells, water wells; cooling water systems including open recirculating, closed, and once-through systems; cisterns and water collection or holding systems, solar water heating systems, boilers and boiler water systems or systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems.

The substrate is made from at least one material selected from carbon steel, stainless steel, iron, copper, nickel, and alloys thereof. As used herein, the term 'alloy' refers to the mixture of two or more elements in which the main component is usually a metal. The alloy may include but are not limited to aluminum, titanium, and magnesium alloys. Steel is an alloy of iron and carbon that is widely used in construction and other applications because of its high tensile strength and low cost. Carbon, other elements, and inclusions within iron act as hardening agents that prevent the movement of dislocations that naturally exist in the iron atom crystal lattices. The carbon in typical steel alloys may contribute up to 2.1% of its weight.

Steels can be broadly categorized into four groups based on their chemical compositions: carbon steels, alloy steels, stainless steels, and tool steels. Carbon steels contain trace amounts of alloying elements and account for 90% of total steel production. Carbon steels can be further categorized intro three groups depending on their carbon content: low carbon steels/mild steels contain up to 0.3% carbon, medium carbon steels contain 0.3-0.6% carbon, and high carbon steels contain more than 0.6% carbon. Alloys steels contain alloying elements (e.g. manganese, silicon, nickel, titanium, copper, chromium and aluminum) in varying proportions in order to manipulate the steel's properties, such as its hardenability, corrosion resistance, strength, formability, weldability or ductility. Stainless steels generally contain between 10-20% chromium as the main alloying element and are valued for high corrosion resistance. With over 11% chromium, steel is about 200 times more resistant to corrosion than mild steel. These steels can be divided into three groups based on their crystalline structure: austenitic steels, ferritic steels and martensitic steels.

Tool steels contain tungsten, molybdenum, cobalt and vanadium in varying quantities to increase heat resistance and durability, making them ideal for cutting and drilling equipment.

In one embodiment, the substrate comprises steel, carbon steel, low carbon steel, mild steel, medium carbon steel, high carbon steel, alloy steel, stainless steel, austenitic steel, ferritic steel, martensitic steel, tool steel, or mixtures thereof. Preferably, the substrate comprises carbon steel. Most preferably the substrate is a carbon steel with a carbon content of 0.05-1.0%, for example, API 5L X grade steel such as X52, X56, X60, X65, X70 to X120, N-80, J55, P-110, T-95, C1018, QT 800, and HS80, and other steel alloys such as 13Cr, 25Cr, Inconel 825, and 316 L. Objects that are made of low-carbon steel include but are not limited to pipelines in the oil and gas industry, water pipelines, and transportation vehicles.

In some embodiments, the carbon steel includes 0.05-0.5 wt. %, more preferably 0.1 wt. % to 0.2 wt. %, and yet more preferably 0.18 wt. % C; 0.5-2 wt. %, more preferably 0.6 to 0.9 wt. %, and yet more preferably 0.8 wt. % Mn; 0.001 to 0.01 wt. %, more preferably 0.003 to 0.006 wt. %, and yet more preferably 0.004 wt. % S; 0.005-0.05 wt. %, more preferably 0.010 to 0.014 wt. %, and yet more preferably 0.012 wt. % P; 0.05-0.5 wt. %, more preferably 0.010 to 0.016 wt. %, and yet more preferably 0.014 wt. % Cu; 0.01-0.05 wt. %, more preferably 0.010 to 0.030 wt. %, and yet more preferably 0.028 wt. % Si; 0.01-0.1 wt. %, more preferably 0.04 to 0.08 wt. %, and yet more preferably 0.05 wt. % Cr; 0.005-0.05 wt. %, more preferably 0.008 to 0.012 wt. %, and yet more preferably 0.010 wt. % Mo; 0.01-0.1 wt. %, more preferably 0.02 to 0.06 wt. %, and yet more preferably 0.04 wt. % Ni; 0.01-0.1 wt. %, more preferably 0.04 to 0.08 wt. %, and yet more preferably 0.05 wt. % Cr; and Fe as a balance.

In some embodiments, the corrosion inhibitor includes a polymer. In an embodiment, the polymer is a fluoropolymer. In an embodiment, the polymer is non-reactive with strong acids, weak acids, ionic salt solutions, halogenated compounds, hydrocarbons, aromatic solvents, aliphatic solvents, oxidants, and weak bases. In one embodiment, the polymer is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers.

In a preferred embodiment, the polymer is polyvinylidene fluoride (PVDF). In some embodiments, the polymer has an average molecular weight of 100,000 to 800,000, preferably 200,000 to 700,000, 300,000 to 600,000, 400,000, to 500, 000 g/mol. In some embodiments, when the PVDF is coated on the substrate, the resulting PVDF film on the substrate is porous with an average pore size of 100 nm to 2 μm, preferably 300 nm to 1.8 μm, 500 nm to 1.6 μm, 700 nm to 1.4 μm, 900 nm to 1.2 μm, or about 1 μm.

In some embodiments, the corrosion inhibitor further includes a filler. The filler may be at least one selected from the group consisting of calcium carbonate, talc, wollastonite, kaolin, silica, carbon black, graphene, dolomite, barium sulfate, aluminum hydroxide, magnesium hydroxide, diatomaceous earth, magnetite, hematite, layered double hydroxide (LDH), halloysite, zinc oxide, and titanium dioxide.

In a preferred embodiment, the filler is an LDH. LDHs are a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules (such as water). Lateral offsets between the layers may result in longer repeating periods. LDHs can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. LDHs may be formed with a wide variety of anions in the intercalated layers (Z), such as dodecyl sulfate (DDS)($CH_3(CH_2)_{11}OSO_3^-$), Cl, Br, nitrate ($NO_3^-$), carbonate ($CO_3^{2-}$), $SO_4^{2-}$, acetate ($C_2H_3O_2^-$), $SeO_4^{2-}$, and combinations thereof. The size and properties of the intercalated anions may have an effect on the spacing of the layers in the LDH, known as the basal spacing. In an embodiment, the LDH has a basal spacing of 0.5 to 3 nm, preferably 1 to 2.5 nm, or 1.5 to 2 nm.

An LDH may be a synthetic or a naturally-occurring layered double hydroxide. Naturally-occurring layered double hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In preferred embodiments, the layered double hydroxide has a positive layer (c) which contains both divalent and trivalent cations, also labeled as a first and second metal, respectively. In an embodiment, the divalent ion is selected from the group consisting of $M^{2+}$ is $Ca^{2+}$, $Mg^{2+}$, $Mn^{2+}$, $Fe^{2+}$, $Cu^{2+}$, $Ni^{2+}$, $Cu^{2+}$, and/or $Zn^{2+}$. In an embodiment, the trivalent ion is selected from the group consisting of $N^{3+}$ is $Al^{3+}$, $Mn^{3+}$, $Cr^{3+}$, $Fe^{3+}$, $Sc^{3+}$, $Ga^{3+}$, $La^{3+}$, $V^{3+}$, $Sb^{3+}$, $Y^{3+}$, $In^{3+}$, $Co^{3+}$ and/or $Ni^{3+}$. In an embodiment, a molar ratio of a first and second metal in the LDH is 1:1 to 4:1, preferably 1.5:1, 2:1, 2.5:1, 3:1, or 3.5:1. In an embodiment, a molar ratio of a first and second metal in the LDH is 2:1. In preferred embodiments, the layered double hydroxide has a $NO_3^-$ intercalated anion. In a preferred embodiment, the LDH has a formula of $X_2Al$, wherein X is Mg or Zn.

In an embodiment, the layered double hydroxide component may have a particulate form, for example in the form of spheres, granules, whiskers, sheets, flakes, plates, foils, fibers, and the like. In some embodiments, the layered double hydroxide particles may have a particle size of 40 to 100 nm, preferably 45 to 90) nm, preferably 50 to 80 nm, preferably 55 to 75 nm, preferably 60 to 70 nm. In some embodiments, the layered double hydroxide particles are in the form of flakes. The flakes may be substantially round or oval shaped or, alternatively, the flakes may be polygonal flakes, such as triangular, square, rectangular, pentagonal, hexagonal, star-shaped, and the like. Such flakes may have a thickness of less than 10 nm, preferably less than 8 nm, preferably less than 6 nm, preferably less than 4 nm.

In some embodiments, the LDH is delaminated and in a form of dispersed flakes. In other words, the flakes of the LDH are pulled apart and are randomly dispersed rather than stacked on top of one another. In some embodiments, the delamination occurs by adding a large intercalating ion such as a DDS anion, which creates larger gaps in the LDH due to its large size, and the hydrophobicity of the dodecyl alkyl tail. In another embodiment, the LDH is delaminated manually by sonicating in a solvent such as dimethylformamide (DMF).

Figure 1B:
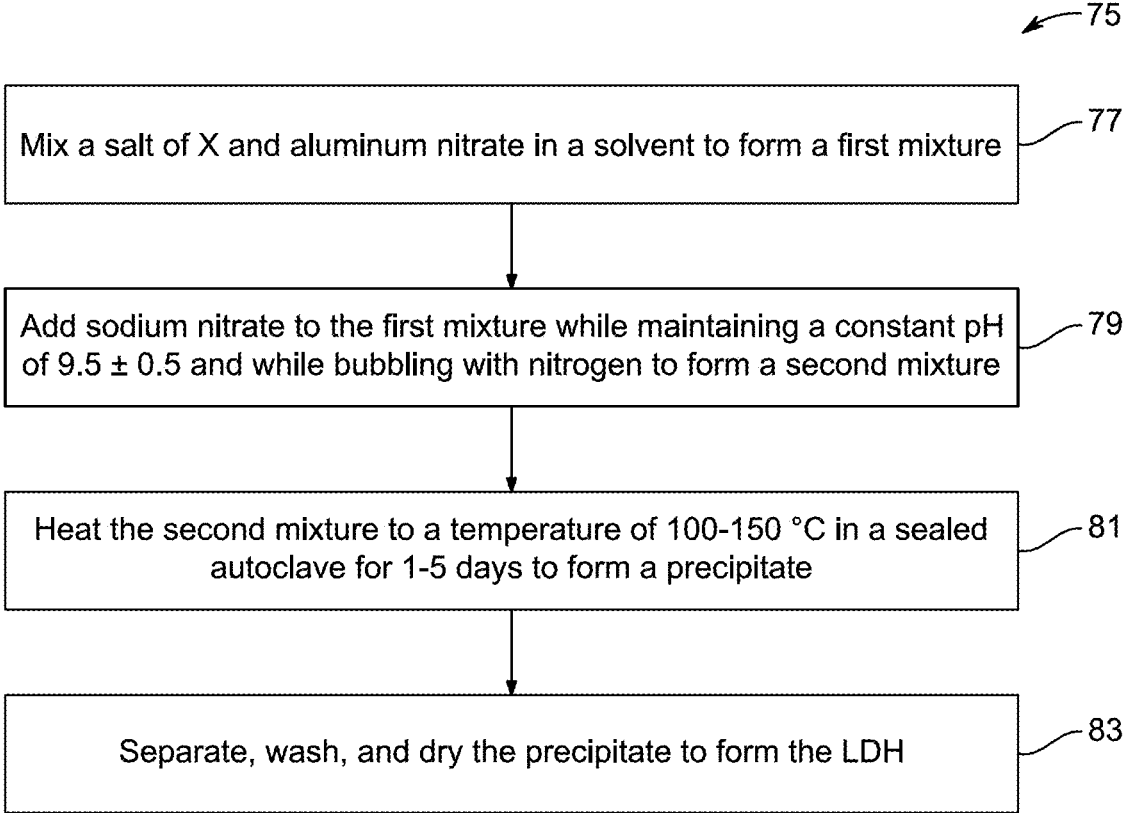
FIG. 1B is a flowchart depicting a method of synthesizing a layered double hydroxide (LDH), according to certain embodiments.

FIG. 1B illustrates a flow chart of a method 75 of making layered double hydroxide (LDH). The order in which the method 75 is described is not intended to be construed as a limitation, and any number of the described method steps can be combined in any order to implement the method 75. Additionally, individual steps may be removed or skipped from the method 75 without departing from the spirit and scope of the present disclosure.

At step 77, the method 75 includes mixing a salt of X and aluminum nitrate in a solvent to form a first mixture. In an embodiment, 'X' is magnesium or zinc. Suitable examples of magnesium salts include silicates, sulfates, sulfites, citrates, chlorides, carbonates, phosphates, nitrates, nitrites, etc. Similarly, suitable examples of zinc salts include sulfates, sulfites, citrates, chlorides, carbonate, phosphate, nitrates, nitrites, etc. In an embodiment, the salt is a nitrate salt. In an embodiment, the 'X' salt is salt is magnesium nitrate hexahydrate. In another embodiment, the 'X' salt is zinc hydrate hexahydrate. The molar ratio of the nitrate salt of Mg or Zn to the aluminum nitrate is in a ratio range of 1:5 to 5:1, preferably 3:1 to 1:3, preferably 2:1 to 1:2, preferably 2:1. In an embodiment, the nitrate salt of Mg or Zn has a concentration range of 0.1-1 M, preferably 0.2-0.8 M, preferably 0.3 to 0.6 M, preferably 0.5 M. The solvent is water. In some embodiments, organic solvents, such as ethanol, butanol, DMF, isopropyl alcohol, ethylenediamine, dimethylamine, trimethylamine, etc.

At step 79, the method 75 includes adding sodium nitrate to the first mixture while maintaining a constant pH of 9.5±0.5 and while bubbling with nitrogen to form a second mixture. This technique is a co-precipitation technique. The concentration of sodium nitrate is in a range of 1-3 M, preferably 1.2 to 2.5 M, preferably 1.5-2 M, preferably 1.5 M.

At step 81, the method 75 includes heating the second mixture to a temperature of 100-150° C., preferably 110-140° C., or 120-130° C. in a sealed autoclave for 1-5 days, preferably 2-4 or about 3 days to form a precipitate. In an embodiment, the second mixture is heated to 120° C. for 24 hours to form the precipitate.

At step 83, the method 75 includes separating, washing, and drying the precipitate to form the LDH. The precipitate was further separated by filtration/centrifugation and washed with water/ethanol several times to remove any ions present in the precipitate. The washed precipitate is further dried to a temperature range of 50-80° C., preferably 55-75° C., preferably 60-70° C., and more preferably 60° C. to form the LDH.

In some embodiments, the corrosion inhibitor comprises 1-5 wt. % of the LDH, preferably 2-4 or about 3 wt. % and 95-99 wt. % of the PVDF, preferably 96-98, or about 97 wt. % based on a total weight of the corrosion inhibitor. In some embodiments, the corrosion inhibitor consists of the LDH and the PVDF. In some embodiments, when the LDH is delaminated, the PVDF penetrates between and is interfacially bonded with the dispersed flakes of the LDH. In other words, the LDH flakes are dispersed in a matrix of PVDF and the two materials interact. The LDH penetrates and at least partially fills, at least 50%, preferably 60%, preferably 70%, preferably 80%, preferably 85%, preferably 90%, or 100% of the pores of the PVDF.

In an embodiment, the coating is performed by sonicating the LDH in a solvent for 20-50 minutes to form a homogeneous dispersion. The solvent may be an organic solvent or an ionic liquid. In an embodiment, the solvent is an organic solvent selected from dimethyl formamide (DMF), toluene, butanol, and water. In an embodiment, the solvent is an ionic liquid selected from ethyl ammonium nitrate (EAN) and 1-butyl-3-methylimidazolium thiocyanate (BMIMSCN). In a preferred embodiment, the solvent is DMF. The LDH is sonicated in the DMF solvent for 10-60 minutes, preferably 20-50 minutes, preferably 30-45 minutes, preferably 30 minutes, causing exfoliation of the LDH into single sheets. The method further includes mixing PVDF to the homogenous dispersion at a temperature of 30-50° C., preferably 40° C. for 20-50 minutes, preferably 25-45 minutes, preferably 30 minutes, to form a mixture. The mixture was further cast on a substrate by any of the techniques known in the art, for example, spin-coating or drop-casting to form the coated substrate. In an embodiment, drop-casting is performed a single time. After drop-casting, the coated substrate was dried to a temperature of 130-180° C., preferably 140-170° C., preferably 150-160° C., for 1-5 hours, preferably 2-4 hours, preferably 2 hours, to allow for evaporation of the solvent. The drying can be done by using heating appliances such as ovens, microwaves, autoclaves, hot plates, heating mantles and tapes, oil baths, salt baths, sand baths, air baths, hot-tube furnaces, and hot-air guns. In some embodiments, the coating is performed a single time to form a single layer of the corrosion inhibitor on the surface of the substrate.

In some embodiments, the corrosion inhibitor of the present disclosure act as an adsorbent and may employ physisorption/chemisorption/both mechanisms when they are in contact with mild steel. In some embodiments, the corrosion inhibitors of the present disclosure can be used with other additives, including demulsifiers, water-wetting agents, surfactants, viscosifiers, commingled gases, defoamers, other corrosion inhibitors such as polymeric materials and salts, organic and inorganic acids, iron control agents, sequestering and/or chelating agents, phosphates, quaternary and amine salts. In a preferred embodiment, the other additives do not include chromium.

At step 54, the method 50 includes contacting the coated substrate with a corrosive medium. As used herein, the term 'corrosive medium' refers to an environment that results in accelerated corrosion, such as acidic and high salt concentration environments. In an embodiment, the corrosive medium includes brine. "Brine" includes NaCl salt water as well as water containing other salts such as KCl, NaCl, KBr, $CaBr_2$ $CaCl_2$), ZnBr, $NaBr_2$, etc. In some embodiments, the corrosive medium comprises an aqueous solution at least one salt (a brine) selected from the group consisting of an alkali metal salt, an alkaline earth metal salt, and hydrates thereof. A brine may be unsaturated or saturated with salt(s). In some embodiments, the corrosive medium includes 1-10 wt. %, preferably 2-4 wt. %, and yet more preferably 3.5 wt. % NaCl; 0.1-1 wt. % more preferably 0.2-0.4 wt. %, and yet more preferably 0.305 wt. % $CaCl_2$); and 0.01-1 wt. % more preferably 0.1-0.2 wt. %, and yet more preferably 0.186 wt. % $MgCl_2$, based on the total mass of the corrosive medium. Neutral salts such as NaCl have been known to cause serious corrosion to mild steel and may be present in an environment at 0.05 M to 2 M, 0.1 M to 1 M, or about 0.5 M.

In one or more embodiments, the corrosive medium contains at least one inorganic acid, at least one inorganic salt, or both. Inorganic acids may be in liquid or gas forms and include acids such as HCl, $H_2SO_4$, $HNO_3$, $CO_2$, and $H_2S$. These inorganic acidic agents may be present in the corrosive medium at saturated concentrations, or at a concentration in a range of 1-2,000 ppm, 10-1,500 ppm, 100-1,000 ppm, 250-800 ppm, 400-700 ppm, or about 500 ppm. In one or more embodiments, the corrosive medium contains at least one of $CO_2$, $H_2S$, and brine. In at least one embodiment, the corrosive medium contains both $CO_2$ and $H_2S$. In at least one embodiment, the corrosive medium contains $CO_2$, $H_2S$, and brine. Preferably, the corrosion inhibitor of the present invention is stable at high temperatures. In one or more embodiments, the corrosive medium has a temperature in a range of 4-150° C., 10-120° C., 20-100° C., 30-80° C., 40-70° C., or 50-60° C. In an embodiment, the coated substrate is allowed to come in contact with the corrosive medium for at least 24 hours, preferably 1 week, 1 month, or at least 1 year.

Corrosion rate is the speed at which metals undergo deterioration within a particular environment. The rate may depend on environmental conditions and the condition or type of metal. Factors often used to calculate or determine corrosion rate include, but are not limited to, weight loss (reduction in weight during reference time), area (initial surface area), time (length of reference time) and density. Corrosion inhibition efficiencies may be measured with the Tafel extrapolation, linear polarization resistance (LPR), potentiodynamic polarization (PDP), gravimetric or other similar methods. In a preferred embodiment, the method described herein in any of its embodiments achieves a corrosion inhibition efficiency in a range of 30-99.9%, 40-99%, 50-98%, 60-95%, 70-93%, 80-92%, or 85-90%. In one embodiment, the corrosion inhibition efficiency of the method disclosed herein is determined according to ASTM G102-89. In an embodiment, the coated substrate in the corrosive medium has a corrosion current, or $i_{corr}$ of less than 0.01 μA $cm^{-2}$, preferably less than 0.005, or 0.001 HA $cm^{-2}$. In some embodiments, the corrosion inhibitor reduces the $i_{corr}$ by at least 200 times, preferably 500 times or 1,000 times compared to the same substrate but without the corrosion inhibitor.

While not wishing to be bound to a single theory, it is thought the delamination of the LDH allowing for interfacial bonding with the PVDF and thereby filling of the pores of the PVDF, prevents the penetration of corrosive species through the PVDF pores, resulting in corrosion inhibition.

EXAMPLES

The following examples demonstrate a method of reducing corrosion as described herein. The examples are provided solely for illustration and are not to be construed as limitations of the present disclosure, as many variations thereof are possible without departing from the spirit and scope of the present disclosure.

Example 1: Materials

Low carbon steel samples (AISI 1004) with dimensions (18.5×18.5×2.5 $mm^3$) were used as substrates, which mainly consist of (0.178%) manganese, (0.0618)aluminum, (0.0473%) carbon, (0.0091%) phosphorous, (0.0062%) sulfur, (0.0048%) copper, (0.0118%) nickel, (0.005) silicon, and (0.0083%) chrome. Zinc (II) nitrate hexahydrate $Zn(NO_3)_2·6H_2O$(LOBA Chemie), magnesium (II) nitrate hexahydrate $Mg(NO_3)_2·6H_2O$ (LOBA Chemie), aluminum (III) nitrate nonahydrate $Al(NO_3)_3·9H_2O$(Techno Pharmchem), sodium hydroxide NaOH(PanReac AppliChem), sodium nitrate $NaNO_3$ (PanReac AppliChem), Poly (vinylidene fluoride) (PVDF, average Mw~534,000 by GPC, powder) (Sigma-Aldrich), N, N-Dimethylformamide (DMF, ACS reagent, ≥99.8%) (Sigma-Aldrich), and sodium chloride NaCl (LOBA Chemie) were used.

Example 2: Synthesis of LDHs

Figure 2:
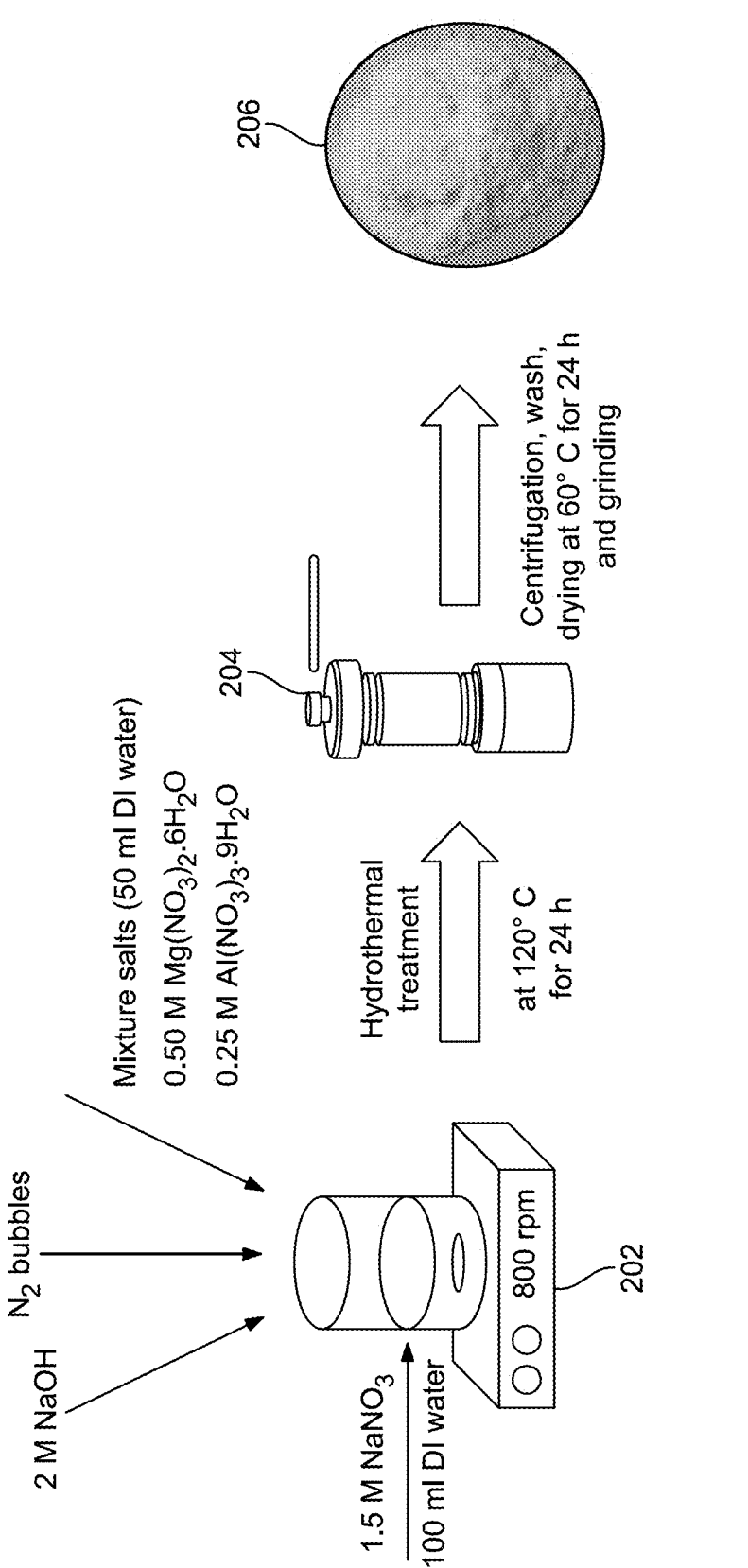
FIG. 2 is a schematic illustration depicting a process of synthesis of a LDH, according to certain embodiments.

FIG. 2 shows a schematic diagram of the synthesis of an LDH. $Mg_2Al_1$—$NO_3$-LDH and $Zn_2Al_1$—$NO_3$-LDH were synthesized by using nitrate salts and a combined co-precipitation then a hydrothermal processing technique. The $M^{2+}/M^{3+}$ in a ratio of 2:1 were used to obtain stable layered composites. For this purpose, 0.50 M Mg or Zn nitrate salts were dissolved in 0.25 M in 50 mL of Al nitrate salt solution. This solution was added slowly to a 1.5 M sodium nitrate solution at a pH=9.5 under constant stirring and kept at room temperature. The pH of the slurry was controlled during the synthesis by addition of a 2 M NaOH solution and held constant at 9.5±0.5. During the synthesis, nitrogen gas was bubbled to exclude $CO_2$ (202). Afterward, the resulting slurry was transferred into a Teflon-lined stainless-steel autoclave with a 200 mL capacity. The autoclave was sealed tightly and transferred into a pre-heated oven at 120° C. for 24 hours to increase the crystallinity of the LDHs (204). Finally, the product was collected by centrifugation, washed five times with deionized water until the filtrate was neutral to ensure that the excess of ions was removed, and finally washed with ethanol. The white powder of LDHs composites was obtained by drying at 60° C. in an oven for overnight and ground into fine powder for further use (206). The synthesized samples were denoted as MLDH, and ZLDH for $Mg_2Al_1$—$NO_3$-LDH and $Zn_2Al_1$—$NO_3$-LDH, respectively.

Example 3: Preparation of Anticorrosion Coatings

Figure 3:
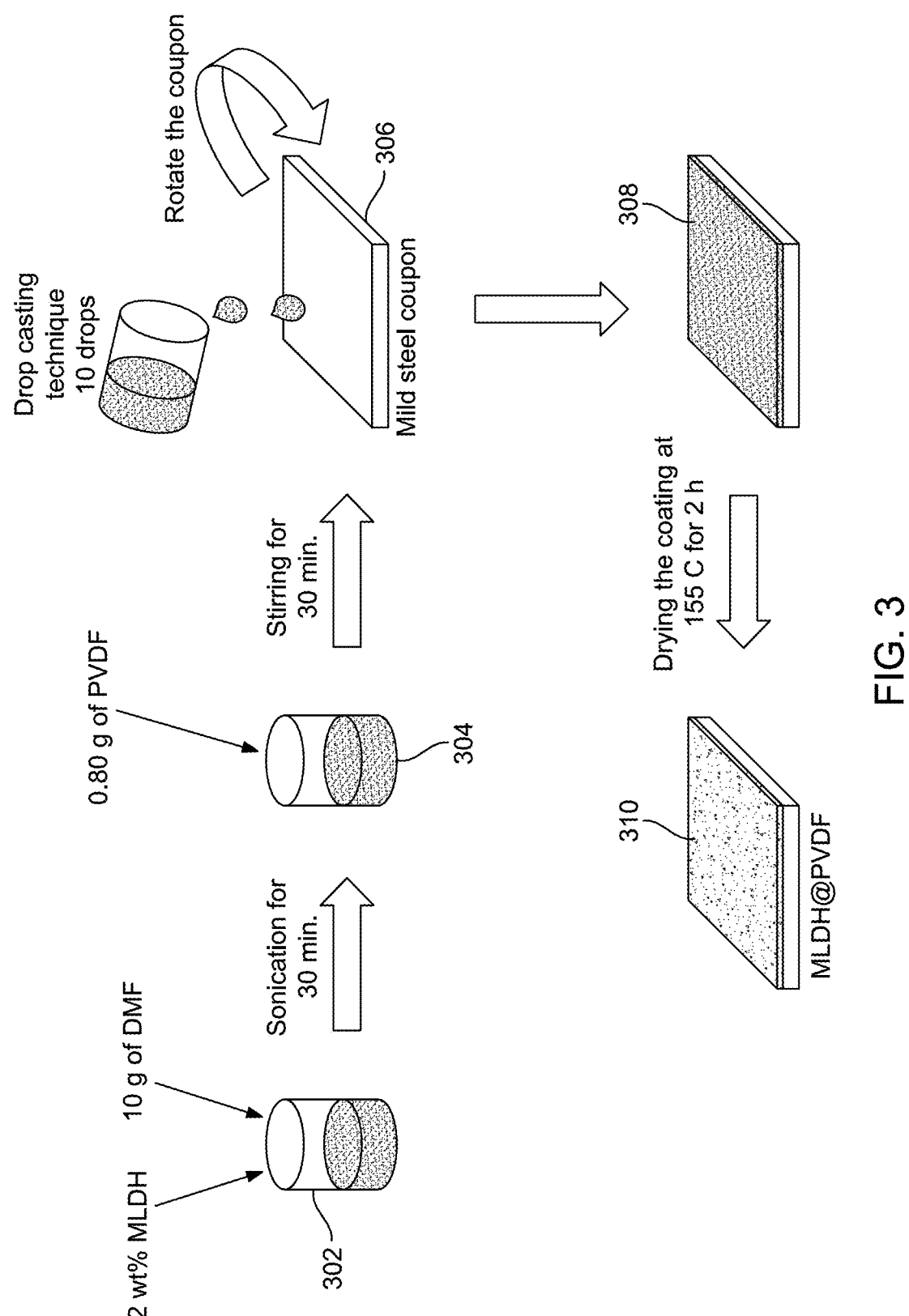
FIG. 3 is a schematic illustration depicting a process of preparing an anti-corrosion coating, LDH@PVDF (polyvinylidene fluoride), according to certain embodiments.

FIG. 3 depicts a schematic illustration of an LDH@PVDF coating preparation. To achieve a homogeneous dispersion solution for anticorrosion coatings preparation, DMF was used to aid dispersion (delamination/exfoliation) of the LDHs crystals under sonication for 30 min (302). DMF plays a dual role in that it dissolves the polymer well and delaminates the LDH into single sheets. After that, a certain amount (about 0.8 g) of polyvinylidene fluoride (PVDF) was added to the previous suspension of LDHs and the mixture was kept under 600 rpm of mechanically stirring at 40° C. for 30 min (304). The mixture was placed on the polished mild steel substrate by drop-casting (306) and then cured in an oven at 155° C. for 2 h (308). The prepared coatings were denoted as neat PVDF, MLDH@PVDF, and ZLDH@PVDF (310).

TABLE 1

Identification of the samples with name codes.

| Sample ID | Meaning |
|---|---|
| Bare substrate | Uncoated mild steel sample |
| Neat PVDF | The coating of PVDF without filler |
| MLDH | $Mg_2Al$—$NO_3^-$-LDH powder |
| ZLDH | $Zn_2Al$—$NO_3^-$-LDH powder |
| MLDH@PVDF | The coating of PVDF with MLDH filler |
| ZLDH@PVDF | The coating of PVDF with ZLDH filler |

Example 4: Coating Characterization Techniques

The LDHs crystalline phase was investigated with X-ray diffraction (XRD) with a Shimadzu X ray diffractometer using Cu Kα radiation over the angle range 2θ range from 2 to 90°. A scanning electron microscopy (VEGA-3, TES-CAN coupled with energy dispersive spectrometer EDS detector, Brno-Kohoutovice Czech Republic) was used to analyze the surface and cross-sectional morphologies as well as the elemental analysis of the specimens. For long-term studies, the samples were immersed in corrosive electrolyte then the photos were collected in various times interval 0, 1, 12, 39, and 60 days.

The electrochemical corrosion measurements of all samples were carried out by a Gamry electrochemical workstation (Interface 1000 E, Model 11146) in a typical three-electrode system in corrosive electrolyte of 3.5% NaCl at ambient temperature. The coated steel panel with a fixed area of 1 cm² was used as the working electrode, a saturated calomel electrode (SCE) as the reference electrode, a Pt sheet as the counter electrode. Tafel plots were recorded by scanning the potential from −0.500 to +1V at a scan rate of 1 mV/min after 1 hour of open circuit potential (OCP).

Example 5: Coating Characterization and Performance

Figure 4:
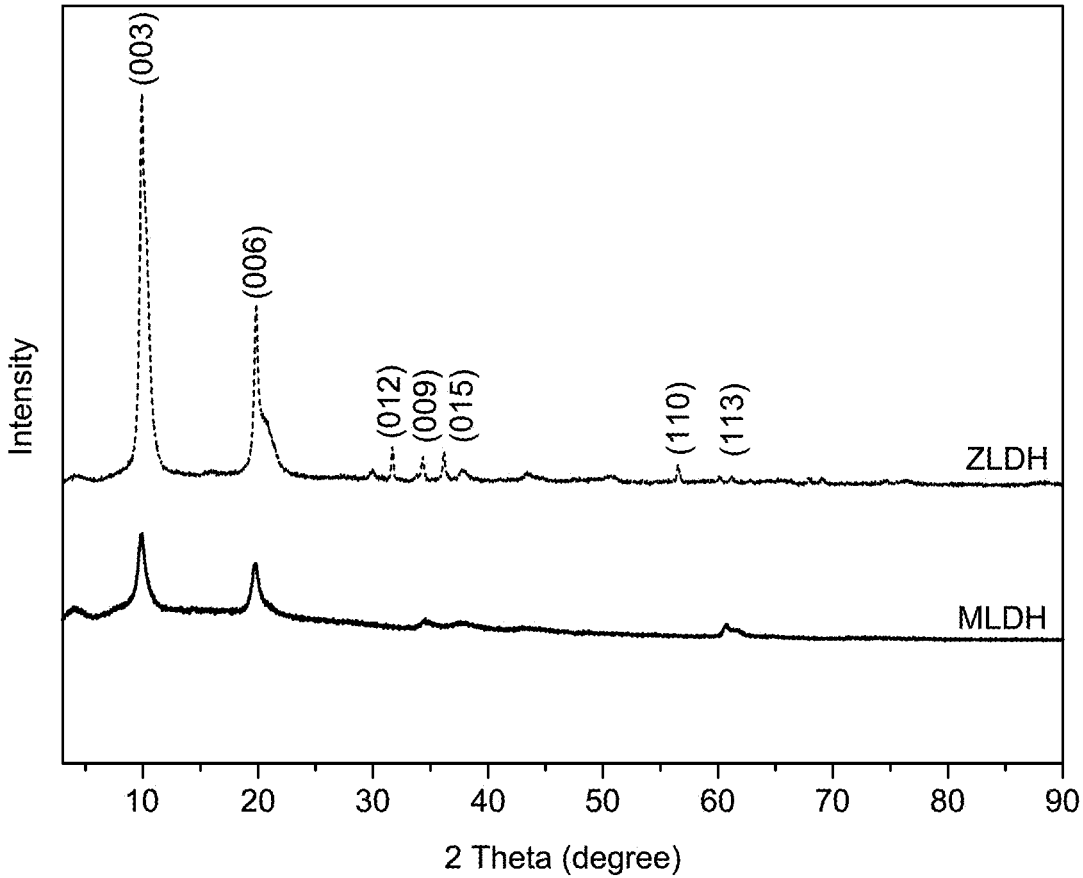
FIG. 4 depicts X-ray diffraction (XRD) pattern of LDH composites, according to certain embodiments.

FIG. 4 illustrates the XRD pattern of the prepared ZLDH and MLDH samples. Both samples display sharp and symmetric peaks associated with the (003) and (006) crystal planes at lower 2θ values while at higher 2θ values peaks are less intense. These results indicate the hydrotalcite nature of the materials having a high degree of crystallinity. Other peaks corresponding to the (009) and (110) planes also exist. The appearance of (110) and (113) reflections signify the typical nature of LDH-based materials.

Figure 5A:
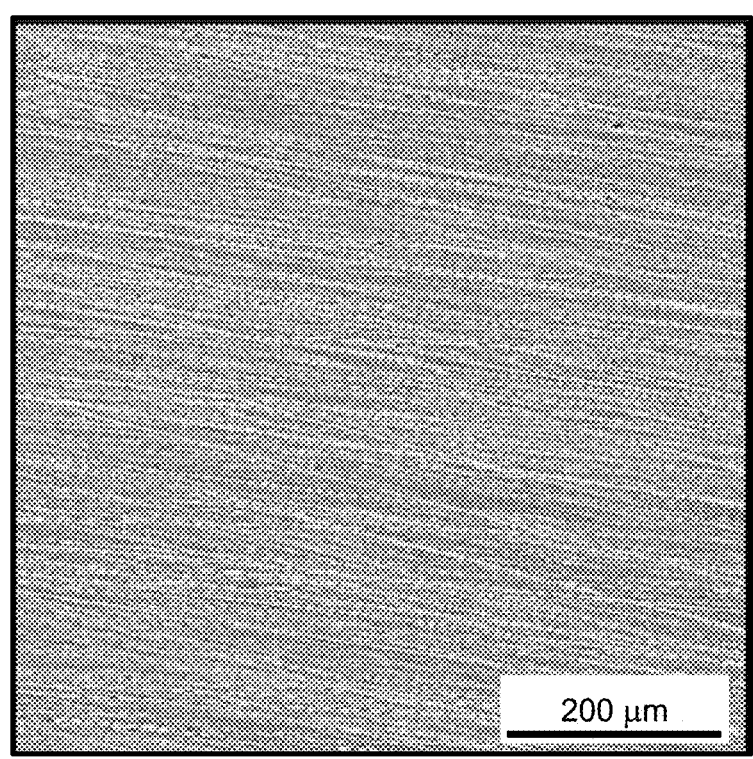
FIG. 5A and FIG. 5B depict scanning electron microscope (SEM) images of a surface and cross-section of uncoated steel, at different magnifications, according to certain embodiments.
Figure 5B:
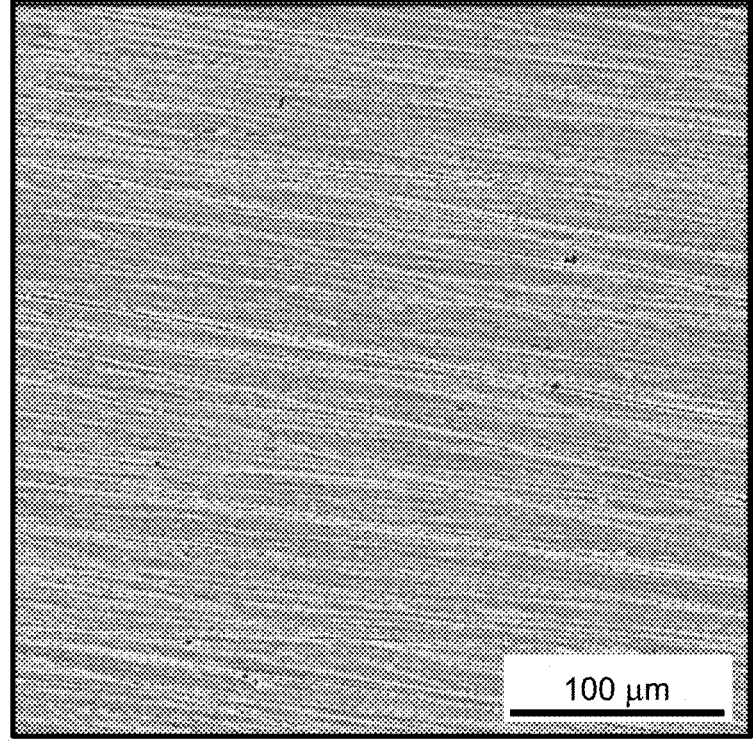
Figure 5C:
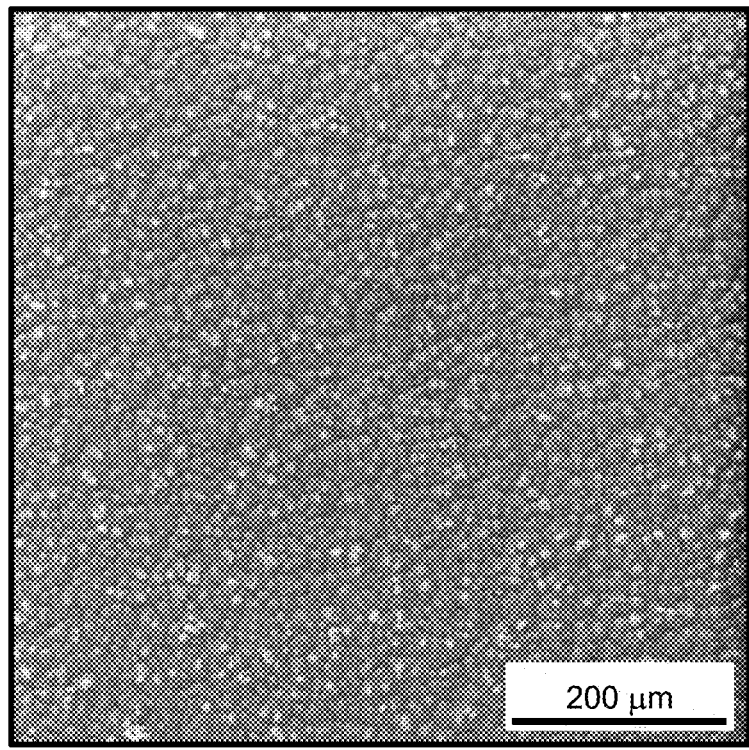
FIG. 5C-FIG. 5E depict SEM images of a surface and cross-section of polyvinylidene fluoride (PVDF), at different magnifications, according to certain embodiments.
Figure 5D:
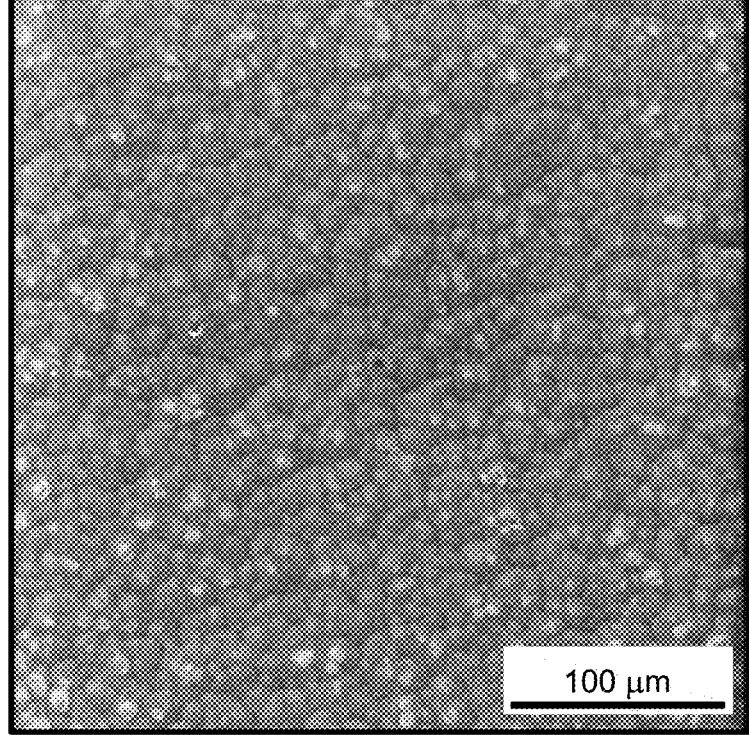
Figure 5E:
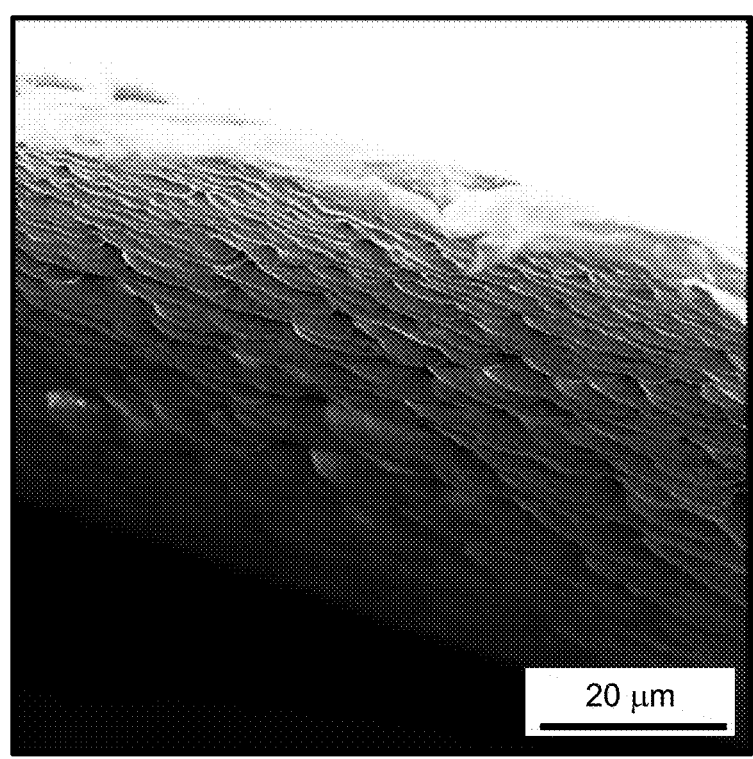
Figure 5F:
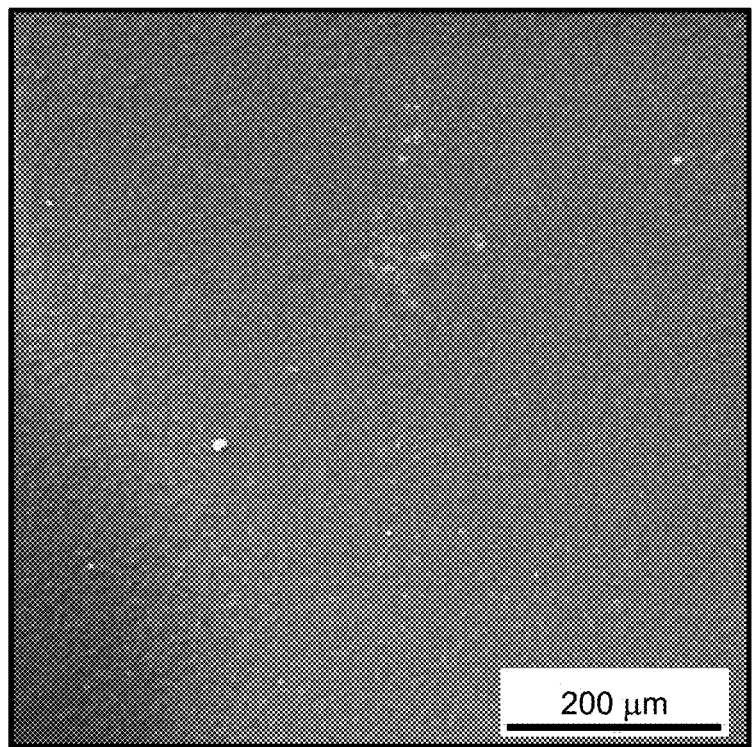
FIG. 5F-FIG. 5H depict SEM images of a surface and cross-section of $Mg_2Al_1$—$NO_3$-LDH (MLDH@PVDF), at different magnifications, according to certain embodiments.
Figure 5G:
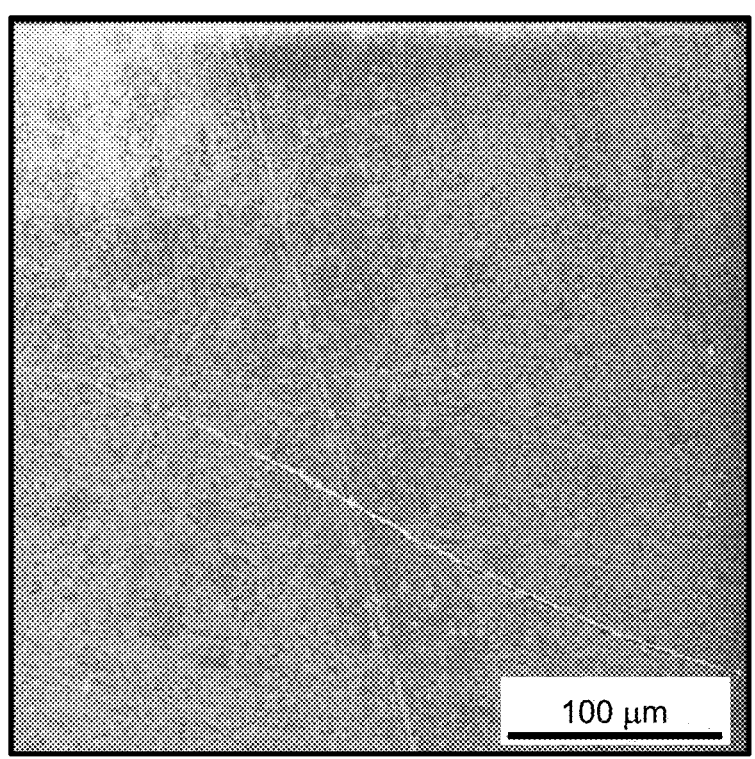
Figure 5H:
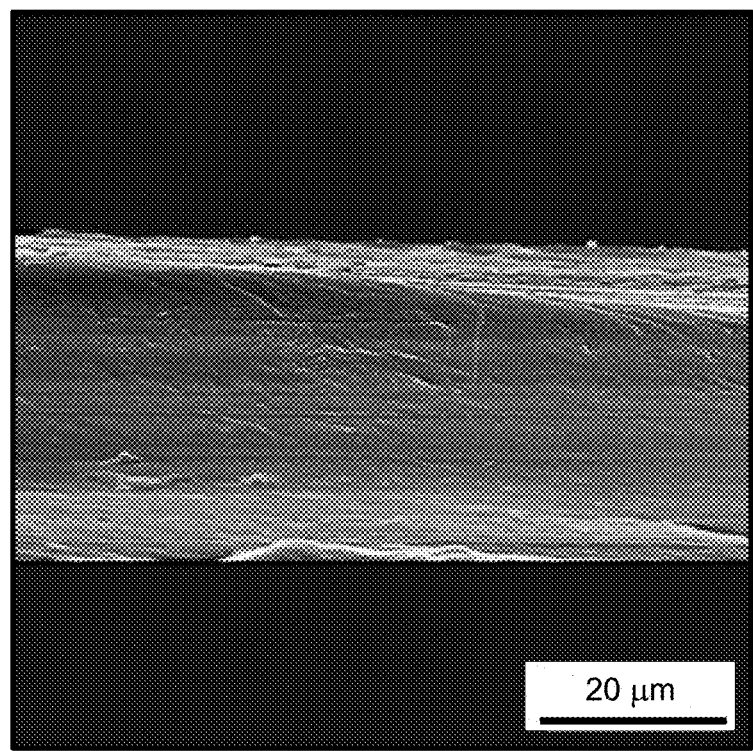
Figure 5I:
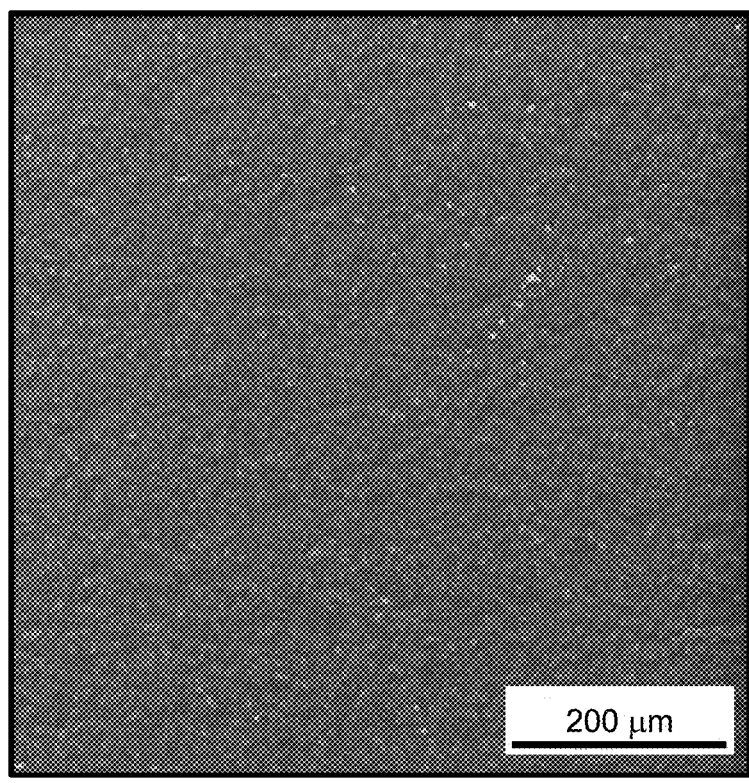
FIG. 5I-FIG. 5K depicts SEM images of surface and cross-section of $Zn_2Al_1$—$NO_3$-LDH (ZLDH@PVDF), at different magnifications, according to certain embodiments.
Figure 5J:
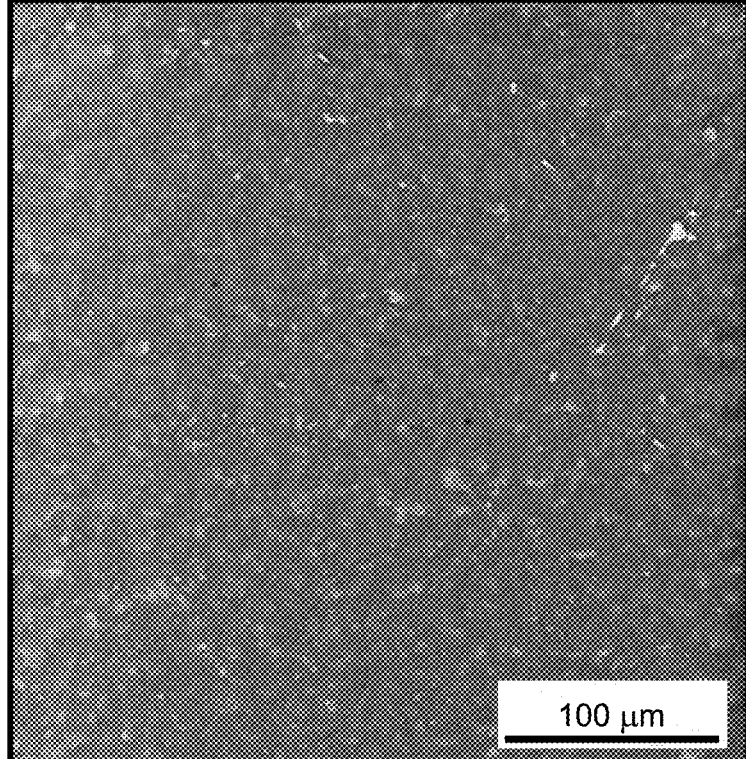
Figure 5K:
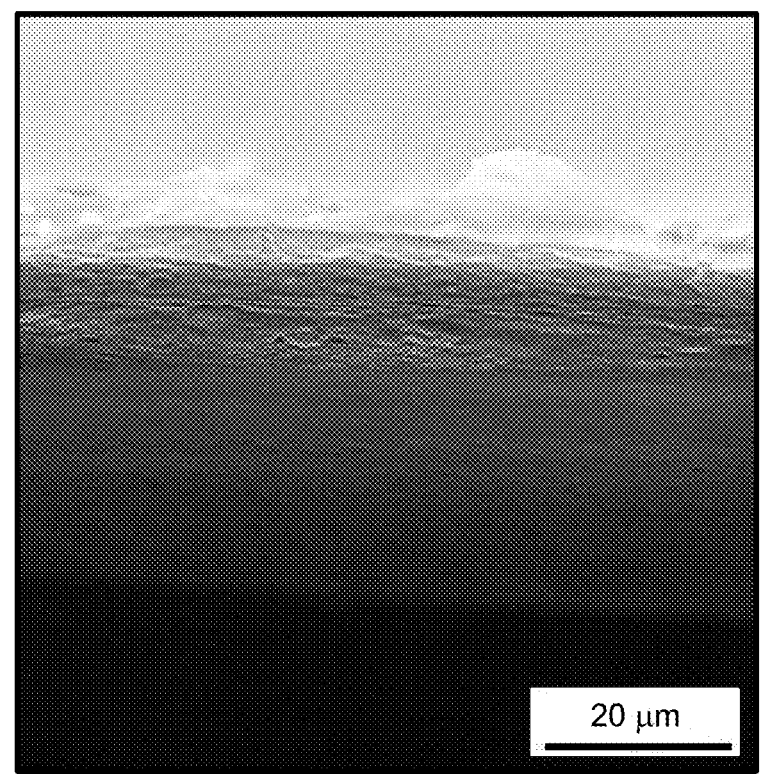
Figures 6A, 6F, 6K, 6P:
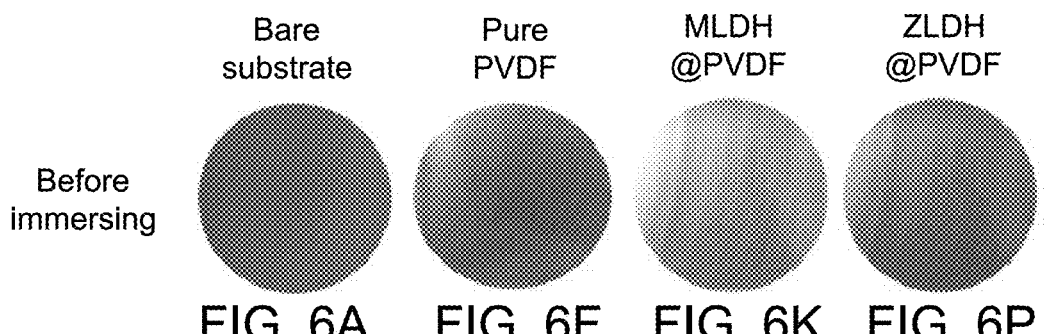
FIG. 6A is an optical image of a bare substrate prior to its immersion in 3.5 wt. % NaCl solution, according to certain embodiments.
FIG. 6F is an optical image of a neat PVDF prior to its immersion in 3.5 wt. % NaCl solution, according to certain embodiments.
FIG. 6K is an optical image of MLDH@PVDF prior to its immersion in 3.5 wt. % NaCl solution, according to certain embodiments.
FIG. 6P is an optical image of ZLDH@PVDF prior to its immersion in 3.5 wt. % NaCl solution, according to certain embodiments.
Figures 6B, 6G, 6L, 6Q:
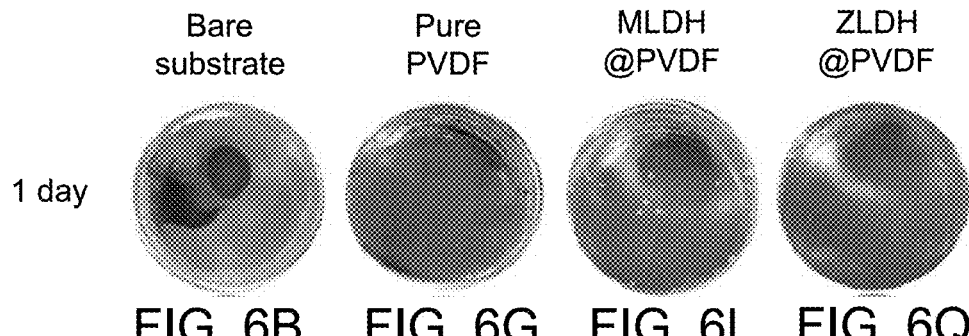
FIG. 6B is an optical image of the bare substrate 1 day after immersion in 3.5 wt. % NaCl solution, according to certain embodiments.
FIG. 6G is an optical image of the neat PVDF 1 day after immersion in 3.5 wt. % NaCl solution, according to certain embodiments.
FIG. 6L is an optical image of the MLDH@PVDF 1 day after immersion in 3.5 wt. % NaCl solution, according to certain embodiments.
FIG. 6Q is an optical image of the ZLDH@PVDF 1 day after immersion in 3.5 wt. % NaCl solution, according to certain embodiments.
Figures 6C, 6H, 6M, 6R:
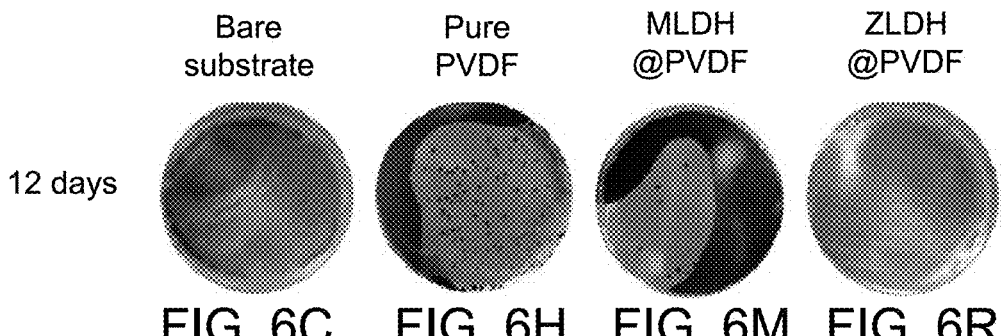
FIG. 6C is an optical image of the bare substrate 12 days after immersion in 3.5 wt. % NaCl solution, according to certain embodiments.
FIG. 6H is an optical image of the neat PVDF 12 days after immersion in 3.5 wt. % NaCl solution, according to certain embodiments.
FIG. 6M is an optical image of the MLDH@PVDF 12 days after immersion in 3.5 wt. % NaCl solution, according to certain embodiments.
FIG. 6R is an optical image of the ZLDH@PVDF 12 days after immersion in 3.5 wt. % NaCl solution, according to certain embodiments.
Figures 6D, 6I, 6N, 6S:
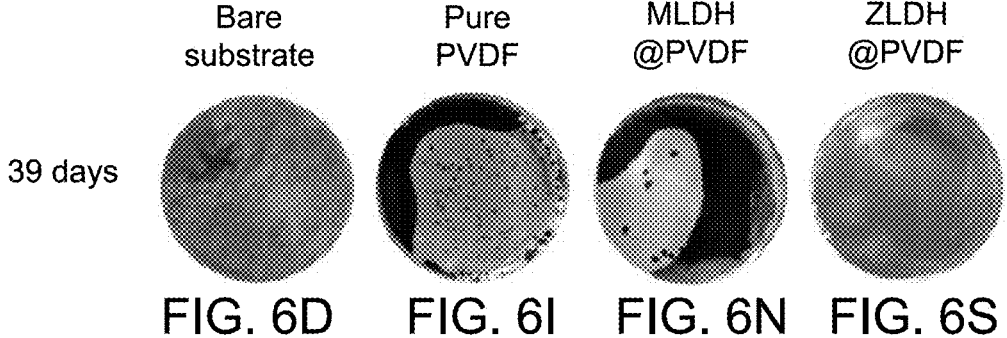
FIG. 6D is an optical image of the bare substrate 39 days after immersion in 3.5 wt. % NaCl solution, according to certain embodiments.
FIG. 6I is an optical image of the neat PVDF 39 days after immersion in 3.5 wt. % NaCl solution, according to certain embodiments.
FIG. 6N is an optical image of the MLDH@PVDF 39 days after immersion in 3.5 wt. % NaCl solution, according to certain embodiments.
FIG. 6S is an optical image of the ZLDH@PVDF 39 days after immersion in 3.5 wt. % NaCl solution, according to certain embodiments.
Figures 6E, 6J, 6O, 6T:
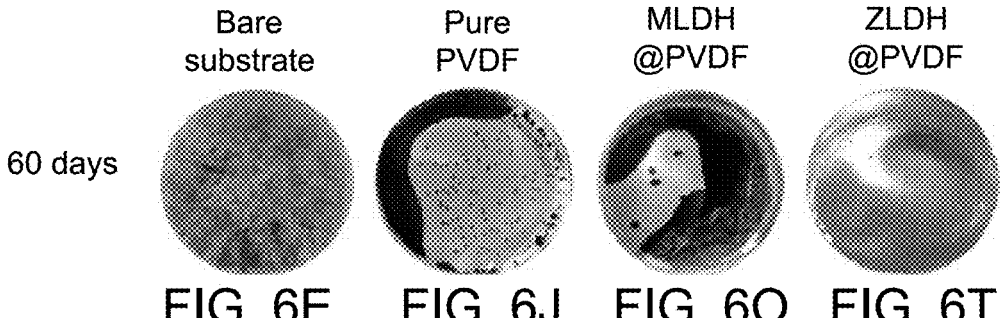
FIG. 6E is an optical image of the bare substrate 60 days after immersion in 3.5 wt. % NaCl solution, according to certain embodiments.
FIG. 6J is an optical image of the neat PVDF 60 days after immersion in 3.5 wt. % NaCl solution, according to certain embodiments.
FIG. 6O is an optical image of the MLDH@PVDF 60 days after immersion in 3.5 wt. % NaCl solution, according to certain embodiments.
FIG. 6T is an optical image of the ZLDH@PVDF 60 days after immersion in 3.5 wt. % NaCl solution, according to certain embodiments.

FIG. 5A-5B depict scanning electron microscope (SEM) images of surface and cross-section of uncoated steel, at different magnifications, FIG. 5C-5E depict SEM images of surface and cross-section of a neat PVDF coating, at different magnifications, FIG. 5F-5H depict SEM images of surface and cross-section of MLDH, at different magnifications, and FIG. 5I-5K depict SEM images of surface and cross-section of ZLDH@PVDF, at different magnifications. From the micrographs (FIG. 5E), the pores of neat PVDF coating can be seen in cross section. However, the pores have been reduced by using the single sheet of LDHs composites as inorganic fillers in FIG. 5H and FIG. 5K.

FIGS. 6A-6E show optical images of a bare substrate prior to its immersion in 3.5 wt. % NaCl solution, 1 day, 12 days, 39 days, and 60 days after immersion in 3.5 wt. % NaCl solution. FIGS. 6F-6J show optical images of neat PVDF prior to its immersion in 3.5 wt. % NaCl solution, 1 day, 12 days, 39 days, and 60 days after immersion in 3.5 wt. % NaCl solution. FIGS. 6K-6O show MLDH@PVDF prior to its immersion in 3.5 wt. % NaCl solution, 1 day, 12 days, 39 days, and 60 days after immersion in 3.5 wt. % NaCl solution. FIGS. 6P-6T show optical image of the ZLDH@PVDF 60 days after immersion in 3.5 wt. % NaCl solution, 1 day, 12 days, 39 days, and 60 days after immersion in 3.5 wt. % NaCl solution. The respective optical images were taken at the conclusion of the 60-day immersed in 3.5 wt % NaCl solution, depicts the coating system's quality. The images depict the degradation of MLDH@PVDF, neat PVDF, and the bare substrate; whereas the ZLDH@PVDF coating remained clear and exhibited no pitting or corroded spots. This result is consistent with the Tafel analysis.

Figure 7:
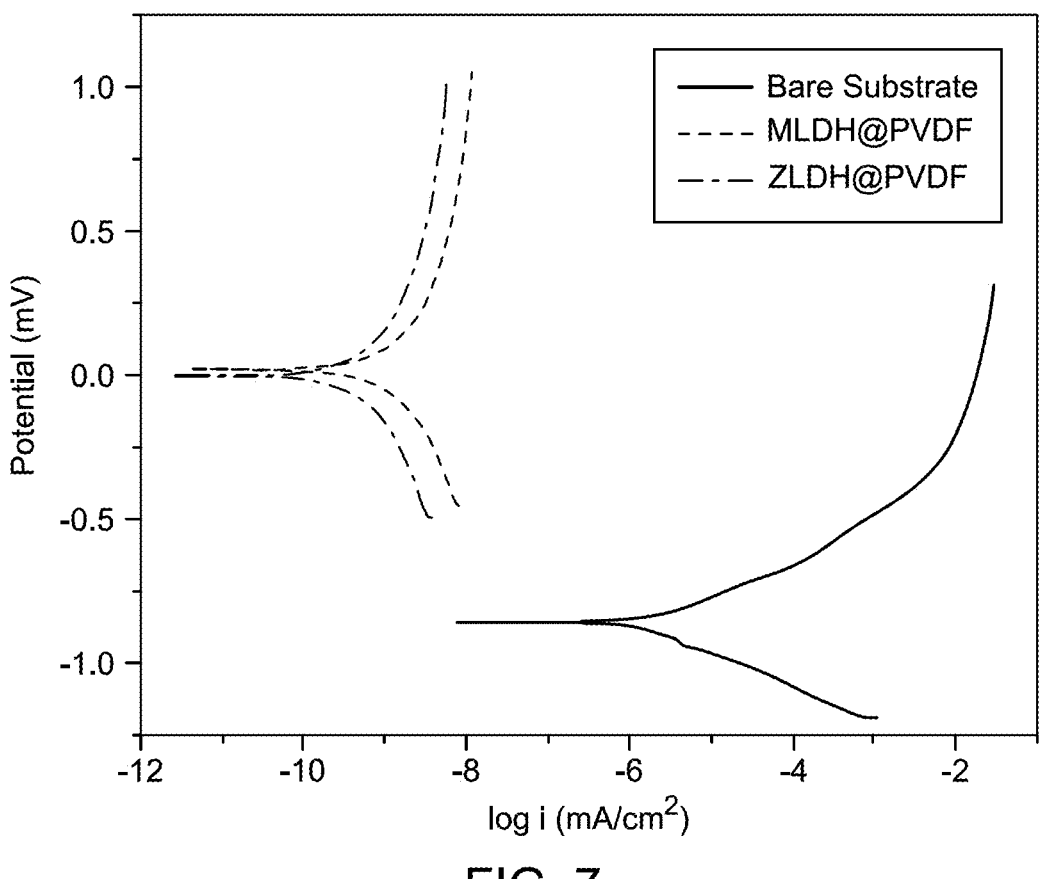
FIG. 7 depicts Tafel plots of various anticorrosion coatings after potentiodynamic polarization (PDP) measurements, according to certain embodiments.
Figure 8:
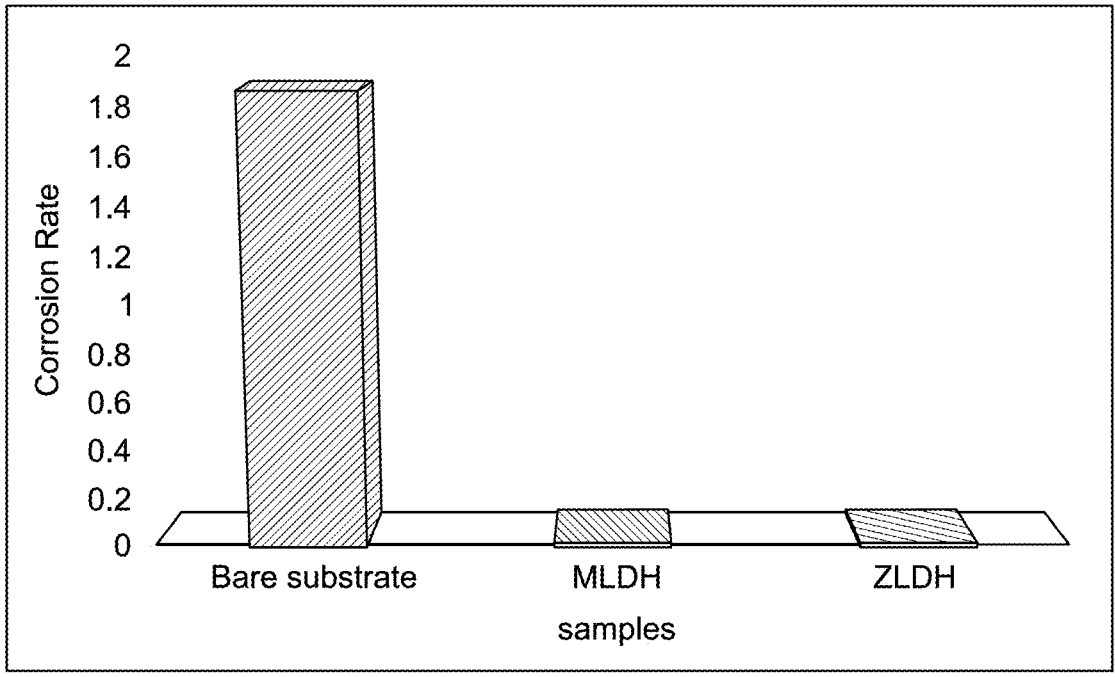
FIG. 8 is a bar graph depicting the comparison of the corrosion rate of the metallic sample with and without the anticorrosion coatings, according to certain embodiments.

FIG. 7 depicts the measurements made using potentiodynamic polarization to determine the corrosion rate. The value of $i_{corr}$ obtained for the bare substrate (uncoated sample) was 1.85 μA then decreased to 0.00653 μA and 0.00221 μA for MLDH@PVDF and ZLDH@PVDF, respectively. The lower $i_{corr}$ value corresponds to the greater corrosion resistance of the coating (FIG. 8). That corresponds to more than 280 times and 800× times slower corrosion rates for MLDH@PVDF and ZLDH@PVDF, respectively. Moreover, it can be deduced from Table 2 that the corrosion resistances (polarization resistance $R_p$) for both coating systems are higher 3 and 4 orders of magnitudes compared to bare steel in 3.5% NaCl solution. The findings show that the specimens coated with the coating system have lower rates of corrosion than uncoated steel, indicating that the invented coating provides greater corrosion resistance.

TABLE 2

Tafel fitting results from the potentiodynamic polarization curves.

| Specimens | $E_{corr}$ (mV vs. OCP) | $i_{corr}$ (μA/cm²) | Tafel slope $\beta_a$ (mV/dec) | $\beta_c$ (mV/dec) | $R_p$ (Ω/cm²) | η (%) |
|---|---|---|---|---|---|---|
| Bare substrate | −857 | 1.85 | 0.138 | 0.132 | $7.91 \times 10^{-1}$ | — |
| MLDH @ PVDF | −5.51 | $6.53 \times 10^{-3}$ | 2.744 | 1.843 | $3.73 \times 10^2$ | 99.64703 |
| ZLDH @ PVDF | 18.6 | $2.21 \times 10^{-3}$ | 1.795 | 1.595 | $2.81 \times 10^3$ | 99.88054 |

Numerous modifications and variations of the present disclosure are possible in light of the above teachings. It is therefore to be understood that within the scope of the appended claims, the invention may be practiced otherwise than as specifically described herein.

The invention claimed is:

1. A method of reducing corrosion, comprising:

coating a surface of a substrate with a corrosion inhibitor to form a coated substrate, wherein the coating includes drop casting the corrosion inhibitor onto the surface of the substrate; and wherein the coated substrate when contacted with a corrosive medium has an $i_{corr}$ of less than 0.01 $\mu A$ $cm^{-2}$, wherein the corrosion inhibitor comprises:

polyvinylidene fluoride (PVDF); and a layered double hydroxide (LDH) having a formula of $X_2Al$, wherein X is Mg or Zn.

2. The method of claim 1, wherein the corrosion inhibitor comprises 1-5 wt. % of the LDH and 95-99 wt. % of the PVDF, based on a total weight of the corrosion inhibitor.

3. The method of claim 1, wherein the LDH is delaminated and in a form of dispersed flakes in the PVDF.

4. The method of claim 3, wherein the PVDF penetrates between and is interfacially bonded with the dispersed flakes of the LDH.

5. The method of claim 1, wherein an interlayer anion of the LDH is $NO_3^-$.

6. The method of claim 1, wherein when coated on the substrate the PVDF is porous with an average pore size of 100 nm to 2 $\mu m$.

7. The method of claim 6, wherein the LDH penetrates and at least partially fills the pores of the PVDF.

8. The method of claim 6, wherein the LDH fills at least 80% of the pores of the PVDF.

9. The method of claim 1, wherein the coating is performed a single time to form a single layer of the corrosion inhibitor on the surface of the substrate.

10. The method of claim 1, wherein the coating is performed by:

sonicating the LDH in a solvent for 20-50 minutes to form a homogeneous dispersion;

mixing the PVDF into the homogeneous dispersion at a temperature of 30-50° C. for 20-50 minutes to form the corrosion inhibitor; and and drying the drop-casted surface of the substrate at temperature of 140-170° C. for 1-5 hours to form the coated substrate.

11. The method of claim 10, wherein the drop-casting is performed a single time.

12. The method of claim 1, wherein the substrate is made from at least one material selected from the group consisting of carbon steel, stainless steel, iron, copper, nickel, and alloys thereof.

13. The method of claim 1, wherein the corrosive medium comprises an aqueous solution at least one salt selected from the group consisting of an alkali metal salt, an alkaline earth metal salt, and hydrates thereof.

14. The method of claim 1, wherein the $i_{corr}$ is determined when the corrosive medium has a temperature of 30-70° C.

15. The method of claim 1, wherein the corrosion inhibitor reduces the $i_{corr}$ by at least 200 times compared to the same substrate but without the corrosion inhibitor.

16. The method of claim 1, wherein the $i_{corr}$ is determined after contacting the coated substrate with the corrosive medium for at least 24 hours.

17. The method of claim 1, wherein the LDH is made by a method comprising:

mixing a salt of X and aluminum nitrate in a solvent to form a first mixture;

adding sodium nitrate to the first mixture while maintaining a constant pH of 9.5±0.5 and while bubbling with nitrogen to form a second mixture;

heating the second mixture to a temperature of 100-150° C. in a sealed autoclave for 1-5 days to form a precipitate; and separating, washing, and drying the precipitate to form the LDH.

* * * * *